United States Patent [19]
Eggert, Jr.

[11] 3,912,295
[45] Oct. 14, 1975

[54] CRASH ENERGY-ATTENUATING MEANS FOR A VEHICLE FRAME CONSTRUCTION

[75] Inventor: Walter S. Eggert, Jr., Huntingdon Valley, Pa.

[73] Assignee: The Budd Company, Troy, Mich.

[22] Filed: Mar. 4, 1974

[21] Appl. No.: 447,628

[52] U.S. Cl. .............................. 280/106 R; 293/63
[51] Int. Cl.$^2$ ......................................... B62D 27/04
[58] Field of Search ................ 280/106 R; 213/1 A; 293/DIG. 3, 63, 73, 88

[56] References Cited
UNITED STATES PATENTS

| | | | |
|---|---|---|---|
| 3,432,200 | 3/1969 | Barton | 293/63 |
| 3,718,364 | 2/1973 | Fischer | 280/106 R |
| 3,751,089 | 8/1973 | Lefeuvre | 213/1 A |
| 3,794,348 | 2/1974 | Fischer | 280/106 |
| 3,804,446 | 4/1974 | Warrener | 293/88 |
| 3,811,698 | 5/1974 | Glance | 280/106 R |
| 3,844,544 | 10/1974 | Keilholz | 267/64 R |

*Primary Examiner*—Leo Friaglia
*Assistant Examiner*—John A. Carroll

[57] ABSTRACT

Crash energy-attenuating means, as for vehicle frame construction, having front and rear crash energy-attenuating means for bumper support with plural stages or modes of low-energy-attenuating means of the column-buckling type; front and rear beam members of in-line or axial column-buckling type for high-energy-attenuation; and secondary front chassis beam members of in-line axial column-buckling type for higher high-energy-attenuation; the energy-attenuating members having axially-offset or axially-eccentric buckling-initiating or buckling-predisposed triggering formation at a point along the length and being whole, entire and unweakened throughout the rest of their body; including memory elastomeric plastic in-line-buckling-predisposed energy-attenuating bumper backing support elements, and secondary or auxiliary in-line buckling-predisposed energy-attenuating bumper supporting elements associated with the elastomeric bumper backing elements.

4 Claims, 23 Drawing Figures

CRASH ENERGY-ATTENUATING MEANS FOR A VEHICLE FRAME CONSTRUCTION

BACKGROUND

In my U.S. Pat. No. 3,547,463, Dec. 15, 1970, there is disclosed a chassis construction in which portions of the chassis beams are pre-buckled by pre-stress beyond the elastic limit. In other prior art there are chassis beams with curved non-linear portions which bend under collision impact loadings — the plastic hinge concept. The collapse of such curved beam portions is comparatively inefficient for energy-attenuation. In-line buckling collapse of beam members, hereby provided, is more efficient for energy-attenuation.

The usual low-energy-attenuating devices for bumpers are piston-cylinder arrangements using flowable liquids or other substances of various fluidities. Such piston-cylinder devices take up much longitudinal space and are subject to injury by water, salt, dirt and potential low-temperature freeze-up.

SYNOPSIS OF INVENTION

The present invention provides an energy-attenuating system in which tubular beam components are pre-shaped at a point along the length, preferably near the end toward the direction in impact, in an axially offset or axially eccentric buckling-predisposed or buckling-triggering conformation to initiate buckling collapse without pre-stress shaping or foreshortening, as in my prior patent, leaving the main body portion of the beam component, intended for eventual buckling, whole, entire and unweakened. The buckling-predisposed beam components are arranged in the frame in such a way as to insure and maintain in-line buckling. There are buckling-predisposed beam components of different strengths which will collapse successively under different ranges of crash loadings.

Between the bumper and body frame there are provided buckling-predisposed memory-restoring resilient elastomeric tubular plastic energy-attenuating elements which absorb low-energy collision impact loadings and return to initial shape after a pre-determined time. The bumper supports also include auxiliary low-energy-attenuating support means in the form of in-line buckling-predisposed collapsible energy-attenuating elements which come into action after the plastic elements have collapsed. These auxiliary energy-attenuating elements are particularly advantageous when the vehicle is to be jacked up at the bumpers, the auxiliary elements forming side-strength members to take jacking loads off the plastic elements, which do not have sufficient lateral rigidity and strength to support jacking loads without undesirable mis-alignment or damage. Herein, for clarity of description, the loadings on the bumpers will be referred to as low-velocity or low-impact means; and the loadings on the frame will be referred to as high-velocity or high-impact means.

The objects of the invention, as well as certain features of novelty and advantages, will be apparent from the following description of an exemplary embodiment, reference being made to the accompanying drawings thereof, wherein.

SPECIFIC EMBODIMENT

Figure 1:
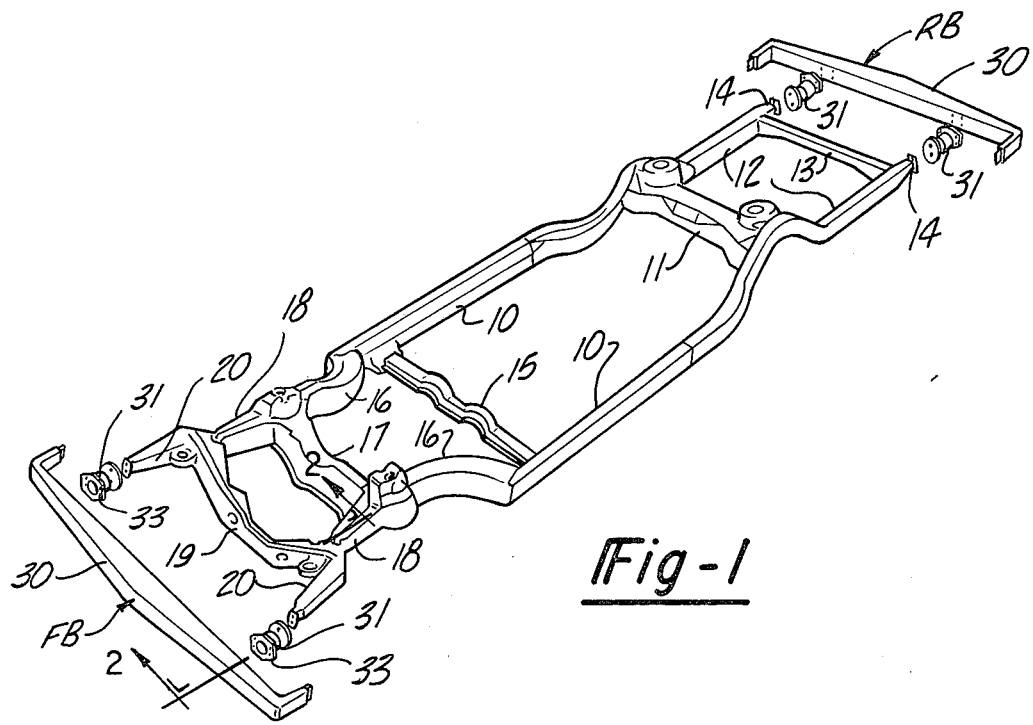
FIG. 1 is a top and side perspective view of a vehicle chassis frame, including bumpers, shown exploded, embodying the invention.

The invention applied to unitary body construction with integrated beam components as well as to full chassis frame construction but herein is illustrated in connection with a chassis frame type of construction.

The chassis frame shown comprises intermediate-length side beam components 10, a main rear cross beam 11, rear side beam components 12, a rear cross beam 13, rear in-line-collapsing energy-attenuating bumper supporting side frame components 14, a front cross beam 15 for supporting the transmission and engine rear, front side beam components 16, a front engine support cross beam 17, front in-line-collapsing energy-attenuating side frame components 18, a front cross beam 19 for supporting the radiator and related parts, and front in-line-collapsing energy-attenuating bumper supporting side frame components 20.

At the rear there is a rear bumper assembly RB and at the front there is a front bumper assembly FB. Since both bumper assemblies are alike, the description will be directed to the front bumper assembly.

The front side frame components 20 provide primary high-energy-attenuating means for the vehicle frame and the side frame components 18 therebehind provide secondary high-energy-attenuating means for the vehicle frame. Each of the beam components 14, 18 or 20 includes at one point, here near the outboard end or direction of expected collision impact, an in-line axially-offset or axially-eccentric buckling-predisposed component or element 25. These buckling-predisposed components are shown in detail in subsequent views. Rectangular tubular members of heavy wall section, have a natural tendency to buckle inwardly on two opposed sides, the other two opposed sides, at the same point along the length, buckling outwardly. At successive points along the length the direction of buckling reverses. This may be termed alternate circumferential corrugating. Round or oval tubes, near round of heavy wall section, have a natural tendency to buckle in longitudinally alternating inward and outward corrugations along the length. This may be referred to as continuous circumferential corrugating. Tubes of oval section, near round, buckle like round tubes and will be considered to come within the term "round."

When any tubular beam begins to collapse from in-line or axial loadings, as in a collision crash impact, the corrugating or buckling action begins at one point and proceeds successively along the length of the tube from the starting point toward the unbuckled portion of the length. The buckling-predisposed or triggering-predisposed formation here shown is provided when the tube is formed and does not involve any prestressing, pre-buckling, or pre-shortening or other deformation or weakening of the tube, that being left whole and entire and able to take axial or oblique loadings at a higher range than if it had been partially pre-buckled throughout all or part of its length.

Figure 21:
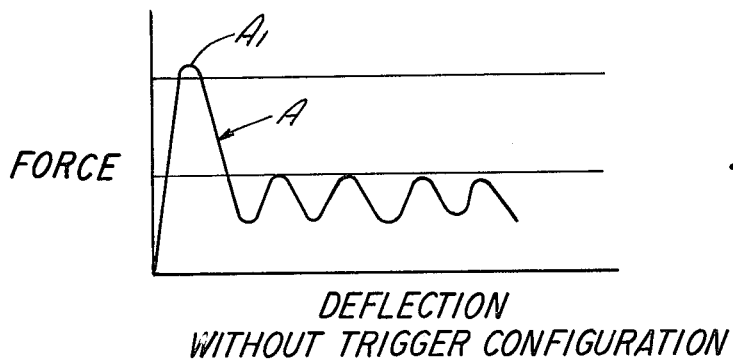
FIG. 21 is a diagram showing the response of a usual un-predisposed beam member to axial collision impact buckling loadings.
Figure 22:
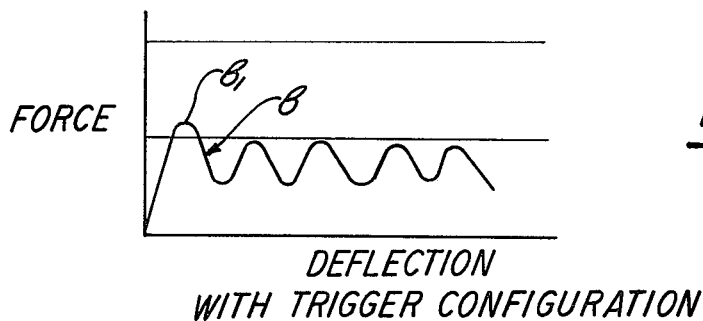
FIG. 22 is a diagram like FIG. 21, but showing the response of the improved buckling-predisposed beam member to axial collision impact loadings.

The diagrams of FIGS. 21 and 22 illustrate the advantages of the present construction. Line A, FIG. 21, shows the force-deflection or load-to-length-change response characteristics of a whole entire tube which has not been pre-stressed or pre-formed in any way. Line B, FIG. 22, shows the response characteristics of a buckling-predisposed tube formed according to the present invention. It will be seen that the tube of the improved form avoids the high peak A1 of the plain tube but after the start, a low peak B1, of buckling takes the same stress or load as that taken by a whole or entire tube. This is true because the short pre-formed component causes the start of buckling at a non-peak load and the remaining whole or entire portion of the length of the tube takes loads at a high range.

The secondary energy-attenuating side beam components 18, which are located behind the primary energy-attenuating components 20, are of heavier stiffer gage material and begin to collapse only after the primary energy-attenuating beam components have buckled to their full extent. The bumpers tie the primary beam components 14 and 20 together at their outboard ends to confine the buckling to in-line or axial action; and the cross beam 19 ties the secondary beam components 18 together at their outboard ends.

Figure 2:
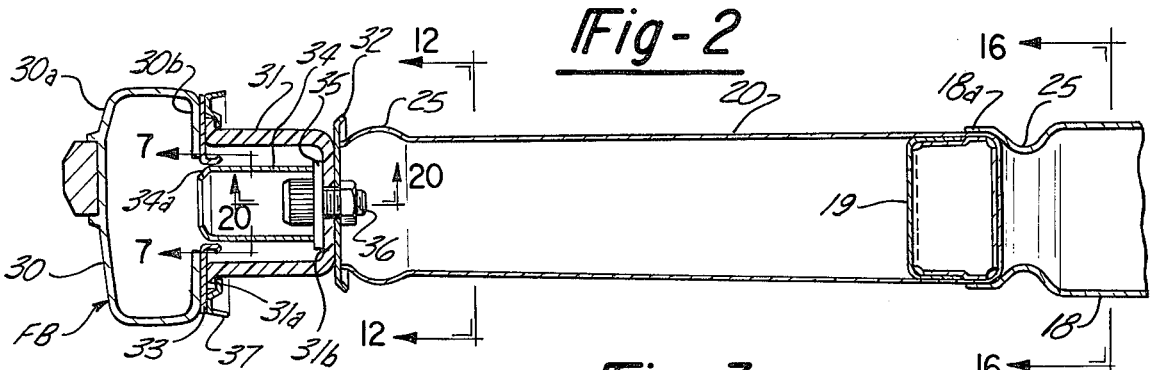
FIG. 2 is an enlarged vertical section, taken along the line 2—2 of FIG. 1, but with the bumper connected in the assembly.

As shown in FIG. 2, the bumper assembly FB (and the same for the rear bumper assembly RB) comprises a transverse bumper proper 30, here shown to have spaced front and rear plates 30a, 30b, respectively, supported at transversely spaced points by tubular (here round) memory-type elastomeric plastic members 31 mounted on plates 32 secured to the front end of the side frame member 20, as by welding.

At the support locations the rear plate of the bumper is provided with an opening inside the plastic member 31 and at the opening there is secured a guide sleeve member 33. Within the plastic member 31, at the rear, there is secured an auxiliary tubular support member 34 having its front end disposed within the opening of the sleeve member 33, enough clearance being left around the member 34 to avoid binding from angularly applied or oblique loads but the fit being sufficiently close to cause the members 34 to take heavy loadings off the elastomeric plastic members 31 when the end of the vehicle is lifted, as by jacking. The members 34, here shown, are circular in cross section.

At the rear the auxiliary tubular member 34 is secured, as by welding, to a support plate 35 and the plate is secured to the plate 32 of the beam member 20, as by a bolt 36.

The elastomeric plastic member 31 has an external flange 31a at its front end by which it can be secured to the back plate 30b of the bumper, as by a retaining ring 37, the retaining ring being secured to the bumper plate in any reliable convenient manner for assembly.

The elastomeric plastic member 31 is formed with a buckling-predisposed portion 31b at the rear or inboard end.

The auxiliary tubular support and energy-attenuating member 34 is formed with a buckling-predisposed portion 34a at its front or inboard end.

Figure 20:
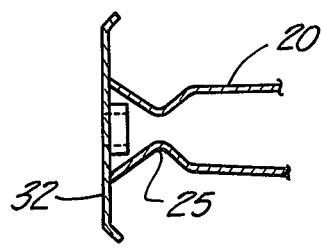
FIG. 20 is a longitudinal horizontal section, taken on the line 20—20 of FIG. 2.

The buckling-predisposed portion 25 of the rectangular side frame member 20 is shown in vertical section in FIG. 2 and in horizontal section in FIG. 20. Here it can be seen that the beam member is formed and disposed in such a way that, in assembly, it has its greater dimension arranged vertically for greater vertical load capacity and its smaller dimension arranged horizontally.

It is to be noted that for efficient initiation of the column-buckling action, the axial offset or axial eccentricity E of the tube, when of steel, needs to be about five (5) times the wall thickness W of the tube. For rectangular tubes and locations other than at the extreme end of the tube the ratio preferably is somewhat greater than 5 to 1. For materials with a modulus lower than that of steel the ratio is smaller.

FIGS. 2 to 6 show the response of the various energy-attenuating members to various stages or degrees of collision impact.

FIG. 2 shows the normal condition of parts.

Figure 3:
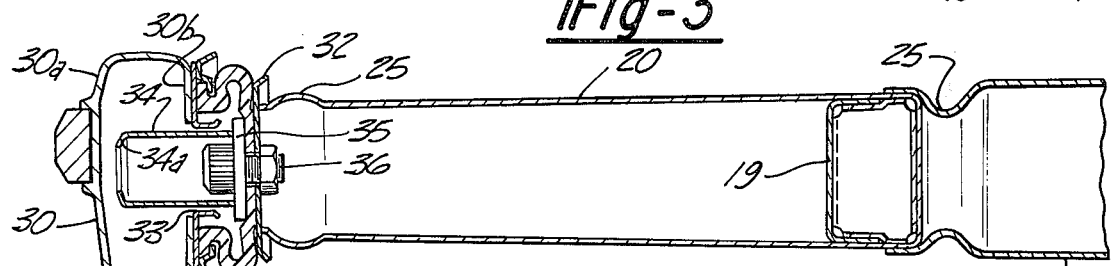
FIG. 3 is a view like FIG. 2, but showing the temporary collapsed condition of the bumper-backing elastomeric low-energy-attenuating means at low collision impact loadings.

FIG. 3 shows the condition for a light or low-velocity, first-degree impact, say at about 5 m.p.h. Here the memory elastomeric plastic member 31 has buckled but will recover most of its original shape in a short time and the rest after a longer period, depending on the kind of elastomer used.

Figure 4:
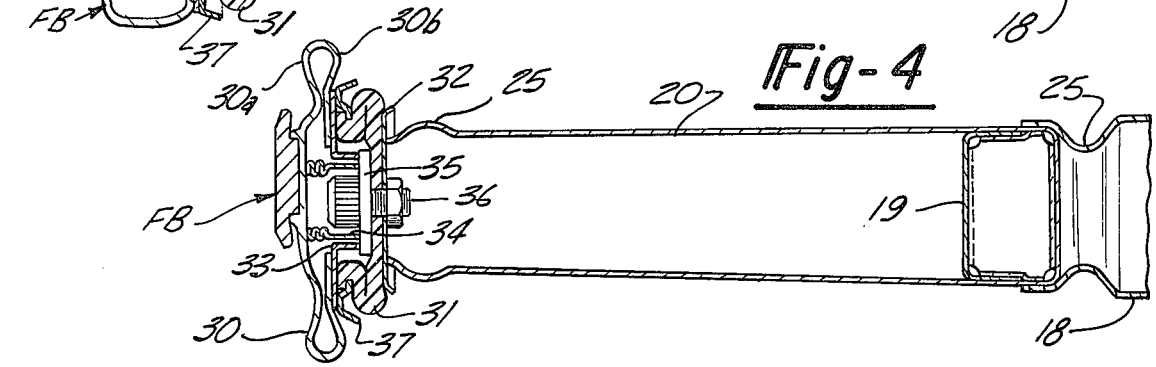
FIG. 4 is a view like FIG. 2, but showing the collapsed condition of the bumper-backing means and the auxiliary bumper-backing energy-attenuating means and bumper.

FIG. 4 shows the condition for a greater or second-degree impact. Now the double-panel bumper 30 has buckled in folding, absorbing some energy, and the tubular bumper support member 34 has buckled at its front end after being engaged by the front plate or panel 30a of the bumper. The collapse of the member 34 is permanent and prevents the elastomeric member 31 from returning to its original shape.

Figure 5:
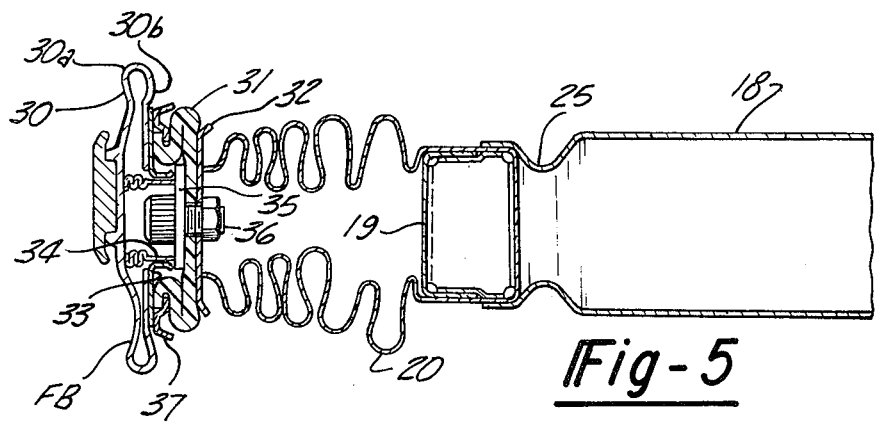
FIG. 5 is a view like FIG. 2, but showing the collapse of the first high-energy-attenuating means after the collapse of the low-energy-attenuating means of the bumper.

FIG. 5 shows the condition for a yet greater or third-degree impact. This may be referred to as a high-velocity or high-energy impact since a beam member 20 of the chassis frame has been buckled.

Figure 6:
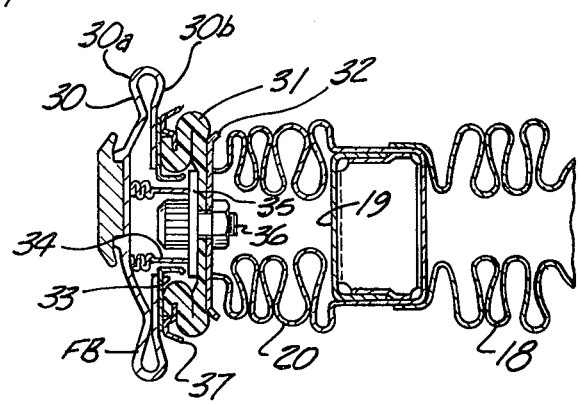
FIG. 6 is a view like FIG. 2, but showing the collapse of the second high-energy-attenuating means of the chassis after the collapse of the previously-acting components shown in FIG. 5.
Figure 7:
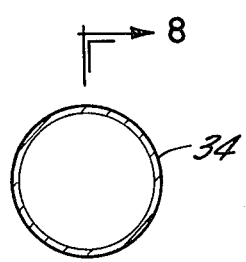
FIG. 7 is an enlarged vertical transverse section, taken on the line 7—7 of FIG. 2.

FIG. 6 shows the condition for a still greater or fourth-degree impact, the greatest for which the illustrated energy-attenuating means has been designed. Here the secondary front side beam member 18 has been buckled.

At the rear end the parts shown have been designed to take only third-degree impact loadings in buckling, since most of the high impact loadings come on the front end, but, if desired the rear side members 12 can be pre-formed at a point to initiate axial buckling collapse.

Except for the tubular elastomeric member 31, which collapses first, the collapse of members is not necessarily always in the order described.

FIGS. 7 to 20 show various forms which the buckling-initiating or buckling-triggering elements may take.

FIGS. 7 to 11 show a round (including oval within natural buckling tendency) tube which has a natural tendency to buckle in concentric axially alternating in-and-out corrugations, with the buckling-initiating elements formed on the end of the tube.

Figure 8:
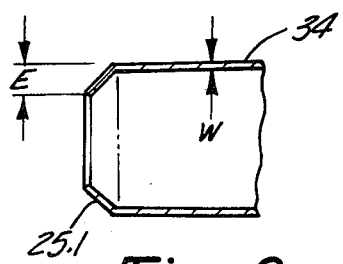
FIG. 8 is a longitudinal section, taken on the line 8—8 of FIG. 7.
Figure 9:
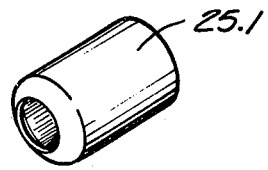
FIG. 9 is an end perspective view of the round tubular member shown in FIGS. 7 and 8.

FIGS. 8 and 9 show the offset or axial eccentricity E to be disposed inwardly of the tube wall W at 25.1. As stated, the offset, for steel, is about five times the wall thickness. Here the first buckling corrugation which will be formed at impact will be external to the tube wall.

Figure 10:
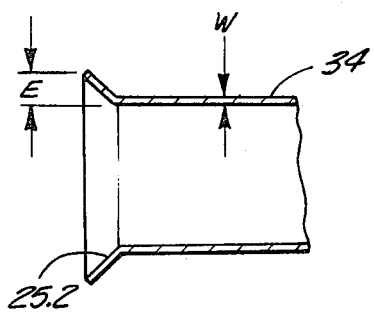
FIG. 10 is a view like FIG. 8, but showing the axial offset or eccentricity buckling-predisposed element as being external instead of internal to the body of the tubular member.
Figure 11:
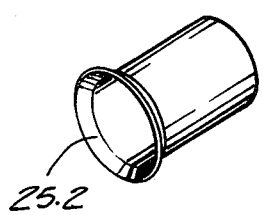
FIG. 11 is an end perspective view of the member shown in FIG. 10.
Figure 12:
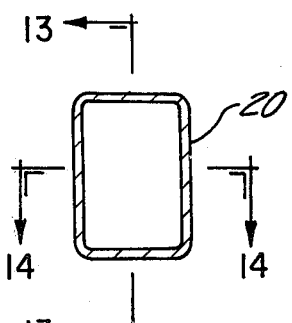
FIG. 12 is a vertical transverse section, taken on the line 12—12 of FIG. 2.
Figure 13:
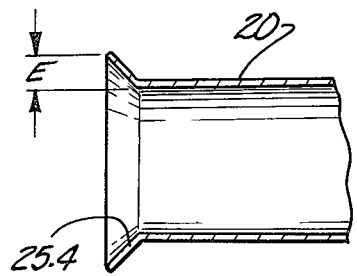
FIG. 13 is a longitudinal vertical section, taken on the line 13—13 of FIG. 12.
Figure 14:
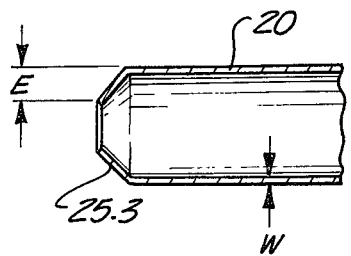
FIG. 14 is a longitudinal section, taken on the line 14—14 of FIG. 12, FIGS. 13 and 14 being altered to show the buckling-predisposed element at the end of the member instead of near the end as in FIG. 2.
Figure 15:
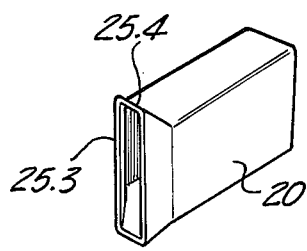
FIG. 15 is an end perspective view of the rectangular tubular member shown in FIGS. 12, 13 and 14.
Figure 16:
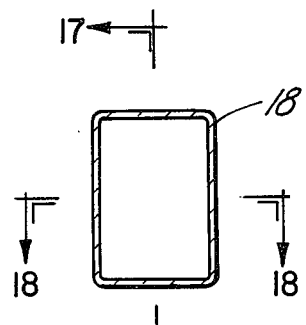
FIG. 16 is a vertical transverse section, taken on the line 16—16 of FIG. 2.
Figure 17:
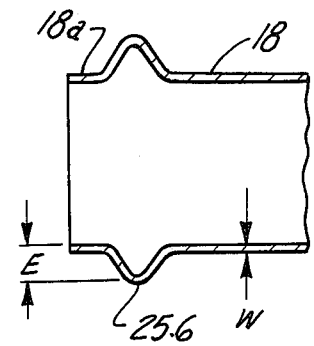
FIG. 17 is a longitudinal vertical section, taken on the line 17—17 of FIG. 16 but omitting interconnected frame parts.
Figure 18:
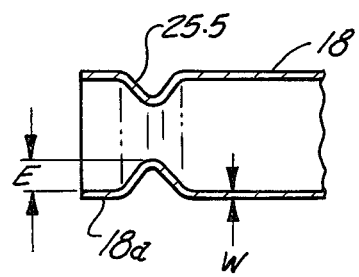
FIG. 18 is a longitudinal horizontal section, taken on the line 18—18 of FIG. 16.
Figure 19:
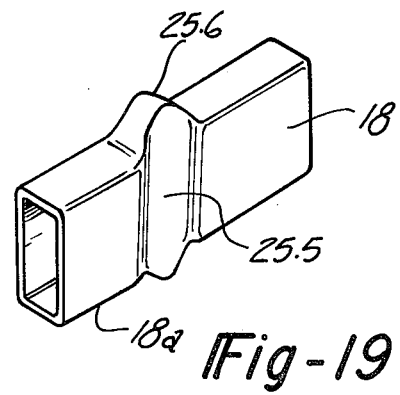
FIG. 19 is an end perspective view of the rectangular tubular member shown in FIGS. 16, 17 and 18.

FIGS. 10 and 11 show the offset 25.2 to be disposed at the end of the tube and outwardly of the tube wall. Here the first buckling corrugation will be internal to the tube wall.

FIGS. 12 to 15 show a rectangular tube which has a natural tendency to buckle in circumferentially alternate in-and-out corrugations in axial alternation along its length, with the buckling-initiating elements formed on the end of the tube. The internal elements 25.3 are formed on the opposite vertical sides to initiate the formation of outward buckling corrugations; and the external elements 25.4 are formed on the opposite horizontal (top and bottom) sides to initiate the formation of inward buckling corrugations.

FIGS. 16 to 19 show a rectangular tube which has a natural tendency to buckle in circumferentially alternating in-and-out corrugations in axial alternation along its length with the buckling-initiating elements formed at a short distance 18a from the front or outboard end. The end formation 18a is used to make the joint connection in the frame, so as a practical matter, the buckling-initiating elements are on the effective front end or buckling portion of the tubular beam. The internal elements 25.5, which are incipient or embryo corrugations, are formed on the opposite vertical sides to initiate the formation of more pronounced outward buckling corrugations; and the internal elements 25.6, which are incipient corrugations, are formed on the opposite horizontal (top and bottom) walls to initiate the formation of more pronounced inward buckling corrugations.

Figure 23:
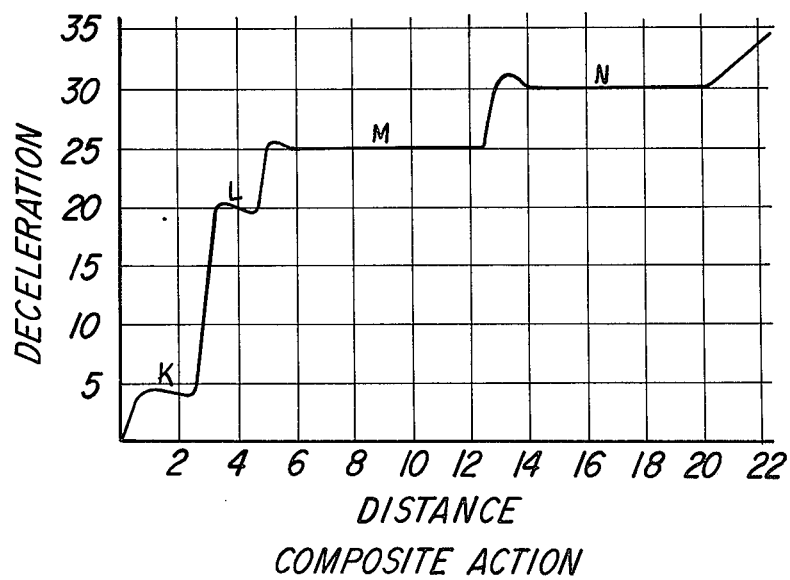
FIG. 23 is a diagram showing the response of the present series-acting energy-attenuating means to successive increasing axial collision impact loadings, the post-impact oscillations being omitted.

The successive responses of the series-acting-axial buckling energy-attenuating members is shown graphically in FIG. 23.

Here, line K indicates the low-load restoring response of the memory elastomeric plastic members 31, of FIG. 3.

Line L indicates the action of the auxiliary bumper members 34, FIG. 4. This includes the folding of the bumper plates.

Line M indicates the action of the front side members 20 of the frame, FIG. 5.

Line N indicates the action of the secondary front side members 18 of the frame, FIG. g.

The values shown in all diagrams are relative since they depend on type and size of vehicle and other factors.

The size and disposition of the energy-attenuating members is such and they are so braced laterally, as by the bumper and cross members 19 and 17 (by the bumper and cross members 11 and 13 in the rear) that the action is confined to axial buckling without side bending.

It is thus seen that the invention provides buckling-predisposed collapsible beam elements which have the buckling-initiating formation located at a point therealong, the members for the rest of their length being whole and entire and of full buckling-resistant strength; also that the buckling-predisposed elements are arranged on a vehicle frame to act in series, those on the bumper acting first at relatively low collision impact loadings and those on the frame acting later at relatively high impact collision loadings. By this arrangement the portion of the vehicle used by occupants is kept free from damage as long as possible to provide maximum safety for the occupants.

While one embodiment of the invention has been described for purposes of illustration, it is to be understood that there may be various embodiments and modifications within the general scope of the invention.

I claim:

1. Crash energy attenuating means for a frame of a vehicle comprising a one piece elongated tubular beam, said tubular beam being uniformly dimensioned substantially throughout its entire length except for a flared portion disposed at one end, a cross member, means for fixedly securing the unflared end of said tubular beam to said cross member, a bumper secured to the end of said tubular beam having said flared portion, said tubular beam having a mode of collapsing in a direction parallel to the longitudinal axis of said tubular beam when an impact force exceeding a predetermined level is applied thereto from said bumper in a direction substantially parallel to the longitudinal axis of said tubular beam, said flared portion collapsing prior to the remaining portion of said tubular beam to start the collapsing said remaining portion in a direction parallel to the longitudinal axis of said tubular beam.

2. Crash energy attenuating means as set forth in claim 1 wherein a pair of similar tubular beams are connected between said bumper and said cross member.

3. Crash energy attenuating means as set forth in claim 2 wherein a second cross member is provided, with a second pair of tubular beams being connected between said first and second cross members, said second pair of tubular beams each having flared portions to trigger collapsing of the main portions of said second pair of tubular beams upon impact forces exceeding a predetermined level, the predetermined level required to collapse said second pair of tubular beam being higher than that required to collapse said first pair of tubular beams.

4. Crash energy attenuating means as set forth in claim 3 wherein an intermediate frame structure is provided and means are provided to attach said second cross member to said intermediate frame structure.

* * * * *